United States Patent
Levy

(10) Patent No.: US 11,250,691 B2
(45) Date of Patent: Feb. 15, 2022

(54) SEISMIC INTRUSION DETECTION WITH OBJECT RECOGNITION

(71) Applicant: SENSOGUARD LTD., Shoham (IL)

(72) Inventor: Tomer Levy, Shoham (IL)

(73) Assignee: SENSOGUARD LTD., Modi'In Region Industrial Park (IL)

( * ) Notice: Subject to any disclaimer, the term of this patent is extended or adjusted under 35 U.S.C. 154(b) by 0 days.

(21) Appl. No.: 17/101,724

(22) Filed: Nov. 23, 2020

(65) Prior Publication Data

US 2021/0104150 A1    Apr. 8, 2021

Related U.S. Application Data

(63) Continuation-in-part of application No. 16/683,999, filed on Nov. 14, 2019, now Pat. No. 10,878,674.

(30) Foreign Application Priority Data

Nov. 16, 2018  (IT) .......................... 102018000010407

(51) Int. Cl.
| | |
|---|---|
| *G08B 13/00* | (2006.01) |
| *G08B 29/24* | (2006.01) |
| *G08B 13/196* | (2006.01) |
| *H04N 7/18* | (2006.01) |
| *G08B 13/12* | (2006.01) |

(52) U.S. Cl.
CPC ............. *G08B 29/24* (2013.01); *G08B 13/12* (2013.01); *G08B 13/19613* (2013.01); *G08B 13/19697* (2013.01); *H04N 7/181* (2013.01)

(58) Field of Classification Search
CPC .. G08B 29/24; G08B 13/19613; G08B 13/12; G08B 13/19697; G08B 13/1663; H04N 7/181

USPC ........................................................ 340/566
See application file for complete search history.

(56) References Cited

U.S. PATENT DOCUMENTS

| | | |
|---|---|---|
| 5,684,458 A | 11/1997 | Calvarese |
| 5,870,022 A | 2/1999 | Kuhnly et al. |
| 8,781,292 B1 | 7/2014 | Ross et al. |

(Continued)

FOREIGN PATENT DOCUMENTS

WO    2017048347 A1    3/2017

OTHER PUBLICATIONS

Chaitanya et al.; "Design of Low Noise Amplifier for Seismic Signals", International Journal of Advance Engineering and Research Development vol. 4, Issue 12 pp. 21-26. (2017).

(Continued)

*Primary Examiner* — Tai T Nguyen
(74) *Attorney, Agent, or Firm* — Novick, Kim & Lee, PLLC; Jae Youn Kim

(57) ABSTRACT

Methods and a system for detecting physical intrusion are providing, including sampling a set of seismic signals from a vibration sensor of a buried sensor intrusion device, determining that the set of seismic signals matches a seismic threat pattern and responsively generating a seismic alert, recording a surveillance video of an area under which the sensor device has been buried, processing the surveillance video to determine whether a human figure is present and, responsively to determining that a human figure is present and to the generation of the seismic alert, issuing an threat detection alert.

17 Claims, 4 Drawing Sheets

(56) References Cited

U.S. PATENT DOCUMENTS

| | | | |
|---|---|---|---|
| 2005/0206515 A1* | 9/2005 | Pakhomov | G08B 25/012 340/521 |
| 2008/0191871 A1* | 8/2008 | Horak | G08B 13/1663 340/566 |
| 2010/0085188 A1 | 4/2010 | Herdic et al. | |
| 2013/0249691 A1 | 9/2013 | Bertoni et al. | |
| 2019/0285748 A1* | 9/2019 | DeVries | H04W 4/029 |

OTHER PUBLICATIONS

Bohlen et al.; "Towards an automatic seismic localization of human footsteps" Near Surface Geophysics 11, pp. 317-323. (2013).

Koc et al.; "Hardware Design of Seismic Sensors in Wireless Sensor Network" International Journal of Distributed Sensor Networks. 8 pages. (2013).

* cited by examiner

SEISMIC INTRUSION DETECTION WITH OBJECT RECOGNITION

CROSS-REFERENCE TO RELATED APPLICATIONS

This application is a continuation-in-part of U.S. patent application Ser. No. 16/683,999, "Energy Efficient Seismic Intrusion Detection," filed Nov. 14, 2019, now issued U.S. Pat. No. 10,878,674, which claimed priority under 35 U.S.C. 119 and 365 to Italian Patent Application No. 102018000010407, filed Nov. 16, 2018, the contents of which are incorporated herein by reference.

FIELD OF THE INVENTION

The invention generally relates to physical intrusion detection and in particular to detecting intrusion via underground seismic sensors.

BACKGROUND

Various methods are known for protecting a restricted area against physical intrusion and for providing alerts or alarms if an intruder trespasses into the area. One method may include burying vibration sensors ("seismic sensors," i.e., sensors detecting vibrations in the earth) around the perimeter of the area. The buried sensors pick up vibrations of the earth, such as may be caused by vehicles or footsteps.

Providing power to buried vibration sensors may be problematic, as buried electric cable costs are high and damage to the cable may be difficult to locate and can incapacitate the system. Sensitivity can also be difficult to calibrate, as it may be difficult to distinguish between many types of phenomenon that cause ground vibrations. These and other difficulties of current solutions are addressed by the present invention.

SUMMARY

Embodiments of the present invention provide systems and methods including a buried seismic intrusion device that detects physical intrusion, with confirmation by visual object recognition. The seismic intrusion device may include a vibration sensor and a sensor controller, including sensor controller memory. The sensor controller memory in turn may include computer-readable instructions that when executed by the sensor controller implement steps of sampling a set of seismic signals from the vibration sensor, determining that the set of seismic signals matches a seismic threat pattern, and responsively transmitting a seismic alert to the hub processor. The system further may include a video camera, configured to record surveillance video of an area under which the sensor device has been buried and to transmit the surveillance video to the hub processor. The hub processor may include a processor memory including computer-readable instructions that when executed by the hub processor implement steps of processing the surveillance video to determine whether a human figure is present, and, responsively to determining that a human figure is present and to receiving the seismic alert, issuing a threat detection alert. Issuing the threat detection alert may include sounding a physical alarm and/or notifying security officers.

The vibration sensor may be affixed to a first part of the seismic intrusion device, while the sensor controller and a battery are affixed to a second part of the seismic intrusion device. The first and second parts, when attached together, form a case containing a wire conducting seismic signals from the vibration sensor to the sensor controller. According to a length of the wire the first and second parts when separated may be buried at different depths. Additional vibration sensors may also connected by additional respective wires to the sensor controller and affixed to additional, separable parts of the sensor device.

Determining that the set of seismic signals matches a seismic threat pattern may include determining that a vibration level is greater than a predetermined vibration threshold. Sampling the set of seismic signals may include sampling according to a first precision setting including parameters of sampling frequency, sampling resolution, and oversampling rate.

In some embodiments, determining that the set of seismic signals matches a seismic threat pattern comprises performing steps of: calculating a representative vibration level of the set of seismic signals; determining that the representative vibration level is greater than a predetermined vibration threshold and responsively changing a first precision setting to a second precision setting by increasing at least one of: a sampling frequency, a sampling resolution, and an oversampling rate; sampling, according to the second precision setting, a second set of seismic signals from the vibration sensor for a predetermined second sampling time period; comparing the second set of seismic signals to one or more stored seismic threat patterns; and responsively to determining a match between the second set of seismic signals and one or more of the stored seismic threat patterns, issuing the seismic alert.

The seismic intrusion controller may be further configured, after issuing the seismic alert, to determine that a subsequent set of seismic signals does not match one or more of the stored seismic threat patterns and responsively to restore the first precision setting and to continue testing seismic signals. Restoring the first precision setting after issuing the seismic alert may include decreasing the vibration threshold for a post-alarm time period. In some embodiments, restoring the first precision setting may include gradually decreasing, over a period of time, one or more precision setting parameters until the parameters equal those of the first precision setting.

Comparing the second set of seismic signals to the one or more stored seismic threat patterns may also include filtering out noise from one or more of the seismic signals of the second set. Determining there is a match may include determining a distance from the seismic intrusion device to a seismic vibration source, and transmitting the seismic alert may include transmitting the seismic alert including a location of a probable intrusion.

Alternatively or additionally, determining there is a match may include determining a correlation between the second set of seismic signals and each of the one or more stored seismic threat patterns and comparing each respective correlation with a preset probability threshold defining a minimum correlation for a match.

Sampling the first set of seismic signals may include sampling 15 to 100 samples and the second sampling time period is 5 to 30 seconds. Calculating the representative vibration level may include calculating a root mean square (RMS) value of the set of seismic signals. The sensor controller may also be configured to determine that the set of seismic signals does not match a seismic threat pattern, and responsively to increase the vibration threshold for a post-event time period.

In further embodiments, the seismic intrusion device may be one of multiple seismic intrusion devices and the video camera is one of multiple video cameras. The hub processor may be configured to associate seismic alerts from each seismic intrusion device with an associated video camera.

There is further provided by embodiments of the present invention, a method for detecting physical intrusion including: sampling a set of seismic signals from a vibration sensor of a buried seismic intrusion device; determining that the set of seismic signals matches a seismic threat pattern and responsively generating a seismic alert; recording a surveillance video of an area under which the sensor device has been buried; processing the surveillance video to determine whether a human figure is present; and, responsively to recognition of a human figure and to the generation of the seismic alert, issuing a threat detection alert.

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

Figure 1:
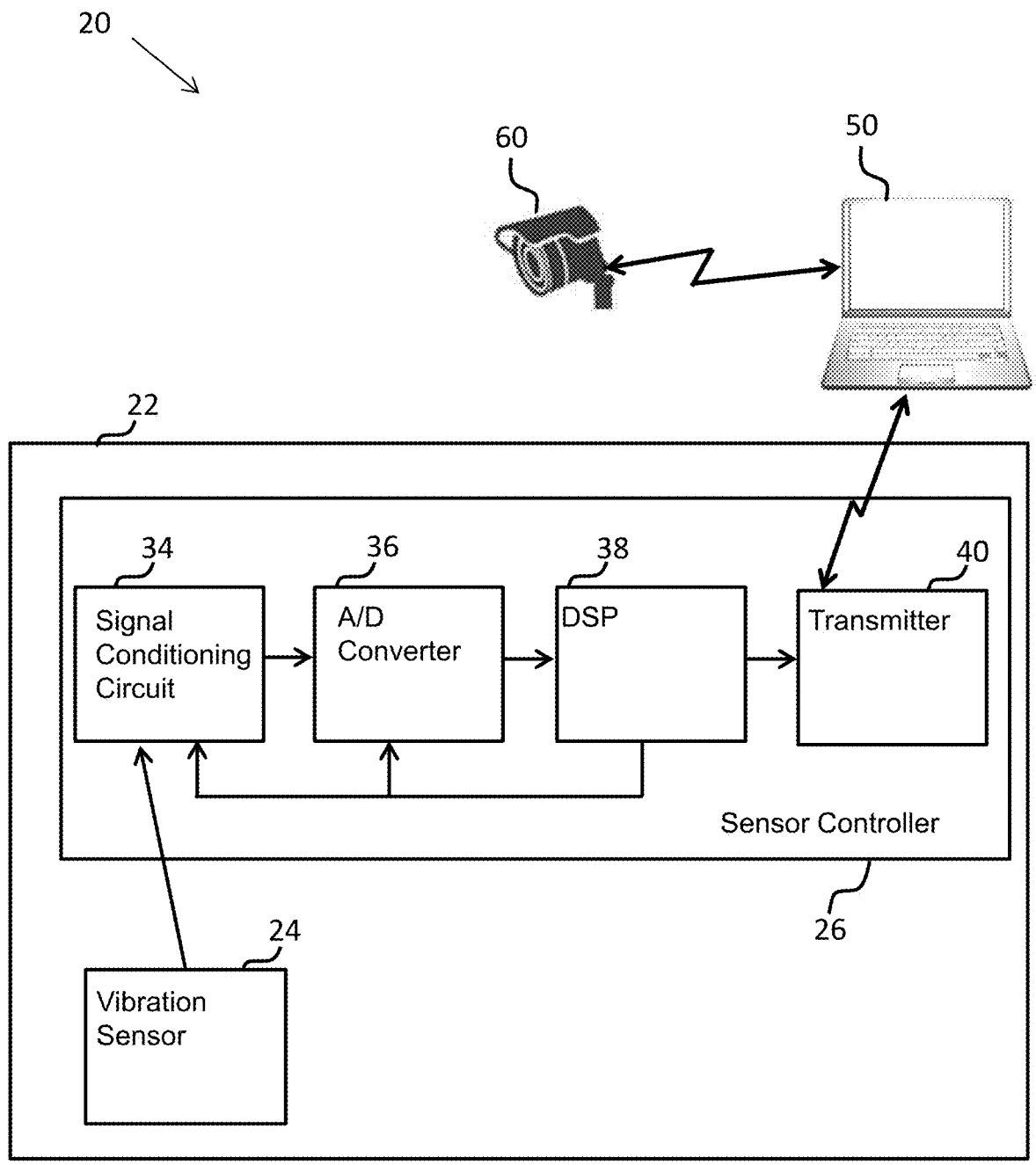
FIG. 1 is a schematic diagram of a system for detecting intrusion, according to some embodiments of the present invention.

FIG. 1 is a schematic diagram of a detection system 20 for detecting intrusion via underground seismic detectors and video cameras, according to some embodiments of the present invention. A seismic intrusion detector 22 may be one of multiple similar seismic intrusion detectors that may be buried around the perimeter of a restricted or protected area. Such an area is typically guarded or otherwise monitored for one or more types of intrusion, such as intrusion by a vehicle, a person, and/or an animal. The seismic intrusion detector 22 is typically battery-powered. The power consumption of such a seismic intrusion detector has a direct impact on how frequently batteries must be replaced, and therefore a direct impact on maintenance costs. Embodiments of the present invention provide methods and systems for reducing the power consumption and thereby reducing maintenance costs. The seismic intrusion detector 22 may include one or more vibration sensors 24, also referred to hereinbelow as seismic sensors, which are typically motion-to-voltage transducers, such as piezoelectric sensors. For monitoring seismic signals indicative of intrusion, such sensors typically have an operating sensitivity to frequencies in a range of, for example, 7 Hz to 400 Hz.

The seismic intrusion detector 22 also may include a battery and battery-powered processing elements that may be configured within a sensor controller 26. The sensor controller 26 may be detached from the vibration sensor 24, as described further hereinbelow with respect to FIG. 3 and FIG. 4.

One or more signal conditioning circuits 34 are typically applied as front-end circuits of the sensor controller 26, in order to improve the signal-to-noise ratio (SNR) in the vibration sensor signals, filtering higher frequency noise while amplifying low frequency vibration signals. The signal conditioning circuit may include analog, low noise amplifier (LNA) circuits. The circuit may attenuate signals at frequencies above or below the frequency band of interest. Topologies of LNAs may include Open Loop Network (OLN), Capacitive Feedback Network (CFN), Miller Integrator Network (MIFN), or Fully Differential Difference Amplifier (FDDA). The output of the one or more signal conditioning filters 34 is typically input to an A/D converter 36, which digitizes the input signals and provides the digital output to a digital signal processor (DSP) 38.

The A/D converter has three key operating parameters that affect the power consumption and the sampling quality (SNR) or precision: the sampling resolution (e.g., 8, 12, 16 or 24 bits per sample), the over-sampling rate (OSR), and the sampling frequency.

In embodiments of the present invention, the DSP 38 is programmed to determine the likelihood that seismic signals indicate an intrusion, as described further hereinbelow with respect to FIG. 2. The process may include matching received seismic signals with signal patterns indicative of different types of intrusions (such as vehicle or human footsteps). Based on the type of intrusion, the DSP 38 may also determine additional features of the intrusion, such as a distance from the intrusion detection device to a source causing the seismic vibrations, as described further hereinbelow.

The precision of the A/D converter 36 may be programmable, such that parameters such as the sampling rate, resolution, and oversampling rate can be adjusted on-the-fly. As described hereinbelow, when the DSP 38 senses an indication of an intrusion, it changes the precision settings of the A/D converter 36 to provide higher precision sampling (higher sampling rate, resolution, and/or oversampling rate). The higher precision sampling also increases the power consumption of the A/D converter. Maintaining the lower precision sampling setting when vibrations are not detected reduces the average power consumption of the system.

Typically, the sensor controller including the transmitter is contained within a single microcontroller, such as an MCU C2000 manufactured by Texas Instruments. When the DSP 38 determines that an intrusion may have occurred, it may send a seismic alert, by a transmitter 40, to a remote hub processor 50, thereby notifying operators of the possible intrusion. Transmitter 40 is typically a wireless transmitter. The hub processor 50 is typically a security system configured to notify security personnel and to log incidents when intrusions occur.

In some embodiments, as described below with respect to process 200 presented in FIG. 2B, the hub processor also receives images from a camera 60. The images may be processed by an object recognition engine, configured to detect if a human is in images, that is, an object recognition engine trained to differentiate between humans and other possible sources of seismic vibration, such as animals. The camera 60 is typically a closed-circuit television (CCTV), that is, a camera providing a video stream of frames. In some embodiments, some or all of the threat detection processing may be co-located with a camera. In further embodiments, multiple seismic intrusion detectors are installed (i.e., buried) at different locations of a site and multiple cameras are installed with camera views facing the respective areas at which the seismic intrusion detectors are installed. The hub processor correlates output of each of the multiple seismic intrusion detectors with images of the detector's respective camera, to generate threat detection alerts as described below.

Figure 2A:
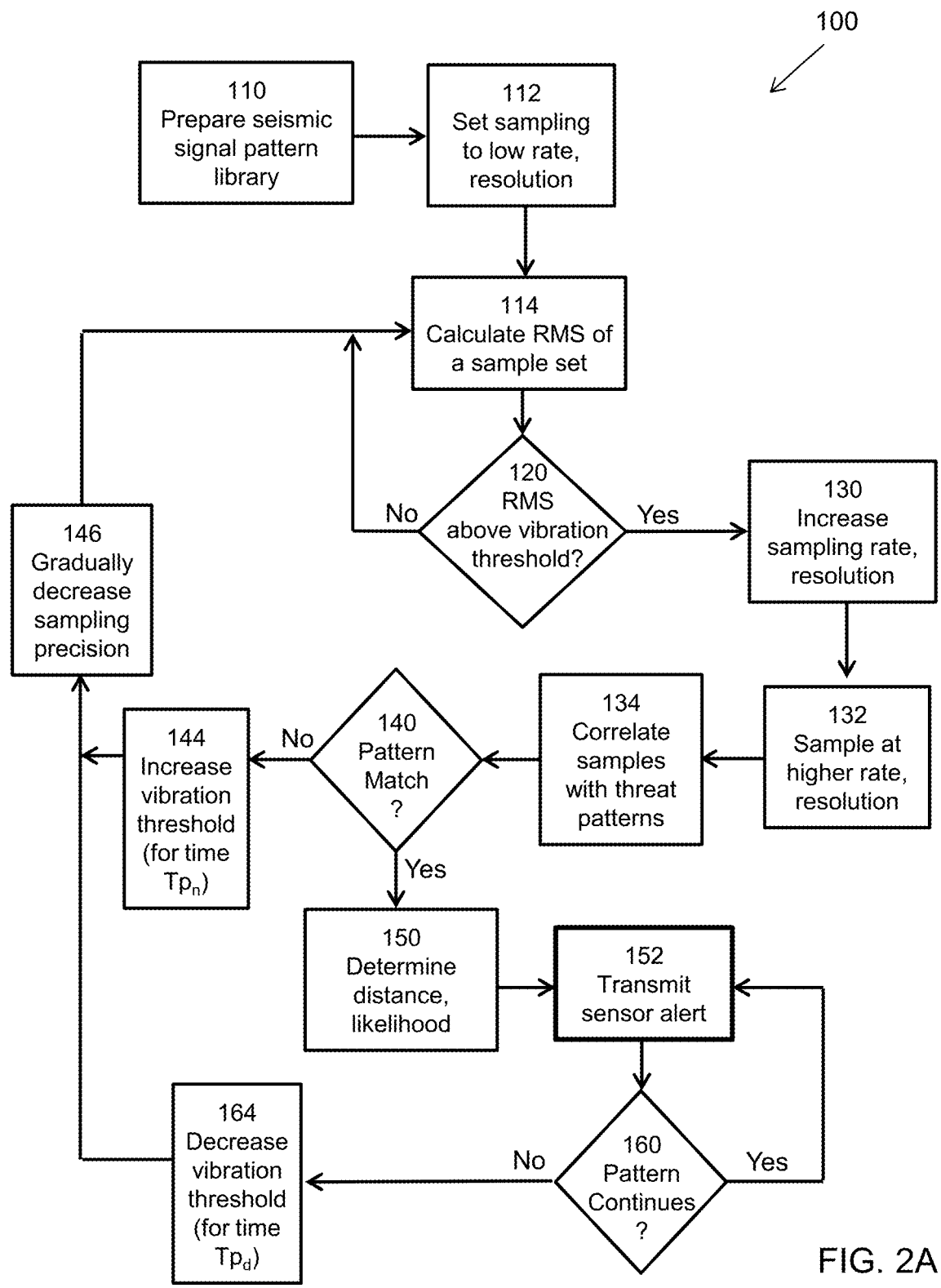
FIGS. 2A and 2B are flow diagrams depicting processes of detecting intrusion, according to some embodiments of the present invention.

FIG. 2A is a flow diagram depicting a process 100 of seismic detection, according to some embodiments of the present invention. At an initial step 110, a signal pattern library (or alternative storage framework) may be stored in memory of the DSP, including patterns of seismic signal samples from known sources, such as human footsteps, vehicles, animals, or heavy equipment (e.g., construction equipment). The patterns are subsequently compared with new seismic signals recorded in real time during system operation, to determine if the new seismic signals correspond to known patterns.

At a step 112, vibration sensors 32 sense seismic signals, producing analog electric signals that are filtered by the signal conditioning circuits 34. The signal conditioning circuit output is sampled by the A/D converter 36 at a low precision setting, that is, at a low sampling rate and/or a low resolution. Oversampling, if performed, is also at a low rate. At the low precision setting, the A/D converter operates at a relatively low level of power consumption. Output of the A/D converter is then received by the DSP.

At a step 114, the DSP, after receiving a set of sampled signals, such as between 15 and 100 samples, calculates a vibration level of the received signals, the vibration level being a representative value of variability or volatility, such as a root-mean square (RMS) value or an average peak-to-peak deviation. At a step 120 the vibration level (a higher "vibration level" being indicative of larger vibrations) is compared with a predetermined vibration threshold. If the level is not greater than the threshold (i.e., "no"), then the vibrations are not great enough to warrant further analysis, and sampling continues at the step 112.

A vibration level (e.g., RMS value) greater than the threshold (i.e., "yes") indicates there may be a source of the vibration that is not merely noise. Processing by the DSP continues at step 130, at which the DSP increases the precision settings of the A/D converter 36, by increasing one or more of the sampling rate, the resolution or the oversampling. At step 132, the A/D converter continues sampling signals from the signal conditioning filters 34, at the higher precision settings. An initial sampling at the higher precision may last for a predetermined amount of time, for example, between 5 and 30 seconds.

At a step 134, the DSP calculates correlations, that is, degrees of matching, between the sampled signals and pre-stored seismic patterns. The pre-stored seismic patterns are representative of seismic patterns generated by various possible vibration sources. In some embodiments, pre-stored seismic patterns may be defined as features of signals generated by different types of sources. Signal matching methods may include methods of Hidden Markov Models (HMM), frequency analysis, differential analysis, linear algebra, spectral distortion, and time distortion. Such methods typically generate values for a probability and an accuracy of a match. Features may also be extracted by a machine learning system, which may be based on classifiers such as the k-nearest neighbors algorithm (KNN), decision trees, or naive Bayes classifiers.

At a decision step 140, correlations between the sampled signals and the stored patterns are compared with a probability cutoff or threshold to determine if there is a "match," that is, a minimum correlation level, which means there is a reasonable likelihood of a target intruder (such as a human intruder or vehicle) being the cause of the sensed vibrations. If there is no match (at the cutoff probability) between any of the stored patterns and the sampled signals, processing continues at step 144, described further below. Otherwise, if there is a correlation, processing continues at step 150, at which parameters of the specific match are extracted. These parameters may include, for example, an estimate of a distance from the sensor to the source of the vibration. The likelihood of a correct match may also be extracted from the calculation of correlation.

At a step 152, the identification of a possible source of vibration may trigger an alarm, or other form of seismic alert, notifying operators of the possible intrusion. The seismic alert may include additional parameters, such as the type of source, the estimated position of the source (based on the estimated distance to the source), and an estimated likelihood of actual intrusion. As described further hereinbelow with respect to FIG. 2B, the seismic alert may be transmitted to the hub processor 50, which may determine how to handle the seismic alert in conjunction with other alerts, such as a visual presence alert based on visual object recognition.

While steps 134-152 are performed, the input seismic signals continue to be sampled and tested by the sensor controller (i.e., the A/D converter and acquired by the DSP) at step 132.

At a step 160, the DSP determines whether new seismic signals indicate a continued possible intrusion by the indicated threat. If the threat continues, the DSP may be configured to continue sending alerts (step 152), and/or to wait for the end of the threat (at which point an alert may be sent indicating that the source of vibrations is no longer detected.

When vibrations conforming to the originally identified pattern are no longer detected, step 164 may be performed, at which the DSP reduces the vibration threshold for a post-alarm time period $Tp_d$, in order to increase the sensitivity of the detection. A typical period of time may be 10 seconds. The vibration threshold is decreased (increasing sensitivity) after a likely intruder is no longer detected, given that the intruder may still be in the vicinity. Conversely, if no intrusion was detected at step 140 (i.e., there was no pattern match), the DSP may increase the vibration threshold for a post-event period of time ($Tp_n$), in order to decrease the sensitivity of the detection. That is, the vibration threshold is increased if an initial signal is determined to be merely noise, because the noise that triggered the initial analysis may still be present.

Whether there was a pattern match or not, the process typically continues at a step 146, at which the precision settings are returned to their original, low power level and the acquisition and testing of seismic signals continues. The return to a low power level may be gradual, as new vibrations are generally more likely to occur soon after a detection event, and a higher precision can permit a faster reaction to subsequent vibrations.

Figure 2B:
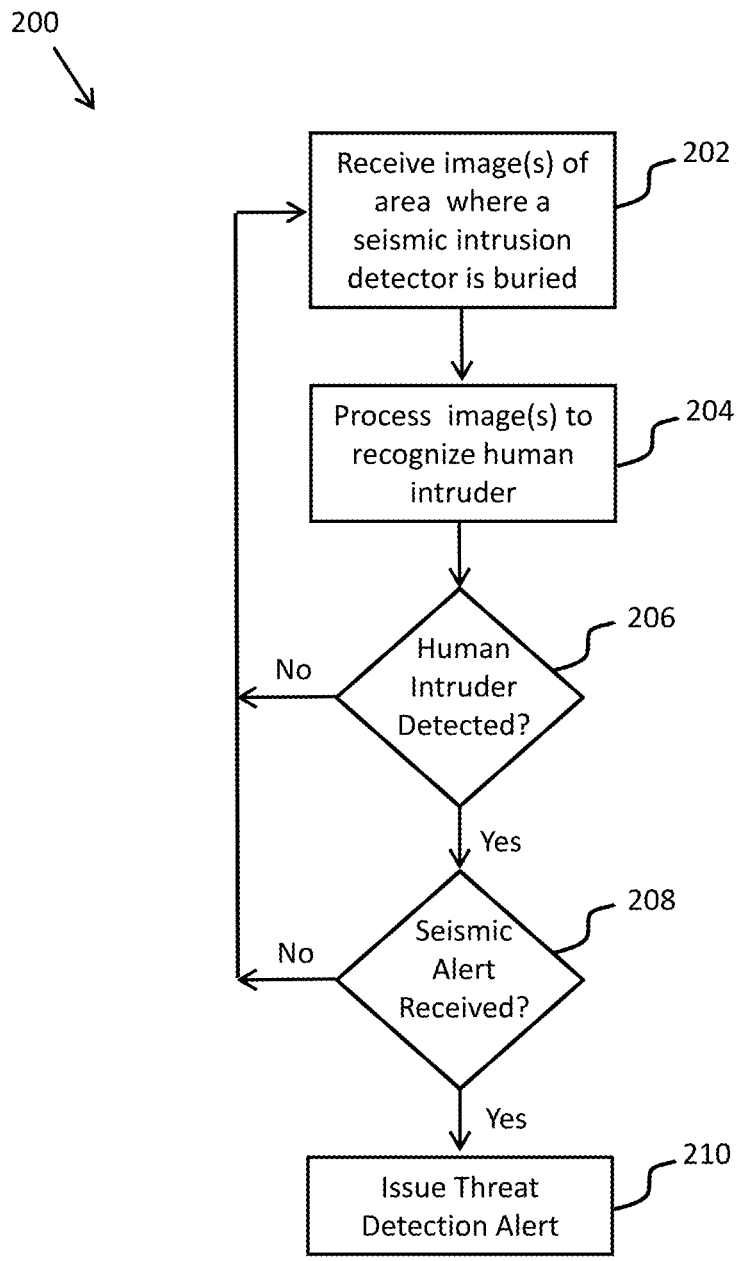

FIG. 2B is a flow diagram depicting a process 200 of intrusion detection, according to some embodiments of the present invention. Process 200 is typically implemented by the hub processor 50 described above, which may be an embedded processor (e.g., an embedded computer board), a stand-alone computer, a distributed computing system, a cloud-based system, or other computing facility. As described above, the hub processor receives images, typically in the form of video streams, from one or more cameras, while also simultaneously receiving seismic alerts from one or more seismic intrusion detectors paired with the cameras. Process 200 presents key aspects of the process implemented by hub processor with respect to a single camera paired with a single seismic intrusion detector, a process that is may be performed independently for each pair of cameras and seismic intrusion detectors.

At a step 202, the hub processor receives an image from a camera that is associated with a given seismic detector, an image that is then processed at a step 204 to determine if a human figure is detected. Processing may be performed, for example, by feeding the image to a deep neural network (DNN) model trained to detect humans, as differentiated from animals. DNN models that may be used include publicly available models such as the TensorFlow Object Detection Model or the Nanonets Machine Learning API.

If the image processing indicates that a human figure is detected (step 206), then, if a seismic alert is received from the seismic intrusion detector (step 208, based on generation of the alert at step 152 of process 100), then the hub processor issues a threat detection alert, such as sounding a physical alarm and/or notifying security officers of the facility being protected. If either of the two criteria is not met, i.e., either a human intruder is not detected or a seismic alert is not received, the hub processor may continue the process by receiving more images and while waiting for an alert. Seismic alerts and the detection of human figures may be recorded as events in a log for subsequent review. A rationale for not issuing a threat detection alert if only one of the criteria is met would be a need to reduce false alarms, as either system, on its own, may generate false positive responses due to a variety of environmental factors.

Figure 3:
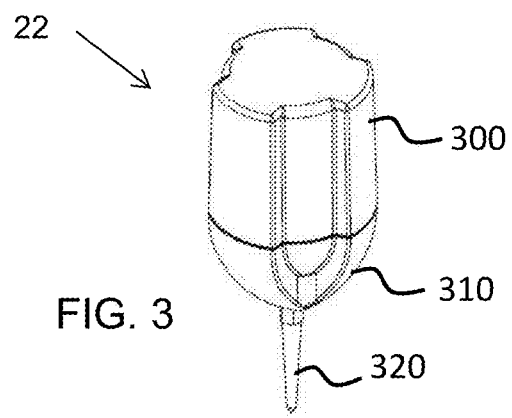
FIG. 3 is a schematic illustration of a buriable seismic intrusion detector, according to some embodiments of the present invention; and, FIGS. 4A and 4B are schematic illustrations of separated parts of a buriable seismic intrusion detector, according to some embodiments of the present invention.

FIG. 3 is a schematic illustration of the seismic intrusion detector 22, according to some embodiments of the present invention. The sensor controller 26, described above with respect to FIG. 1, is contained within a top part 300 of the seismic intrusion detector 22, and is affixed in a detachable manner (such as by pressure clips or screw threads) to a bottom part 310. The bottom part 310 may include the vibration sensor 24, described above with respect to FIG. 1. The sensor controller part typically includes processing elements, a transmitter, and a battery.

The bottom part 310 of the seismic intrusion detector may also include a pin 320 for convenient positioning of the bottom part in the ground.

Figures 4A, 4B:
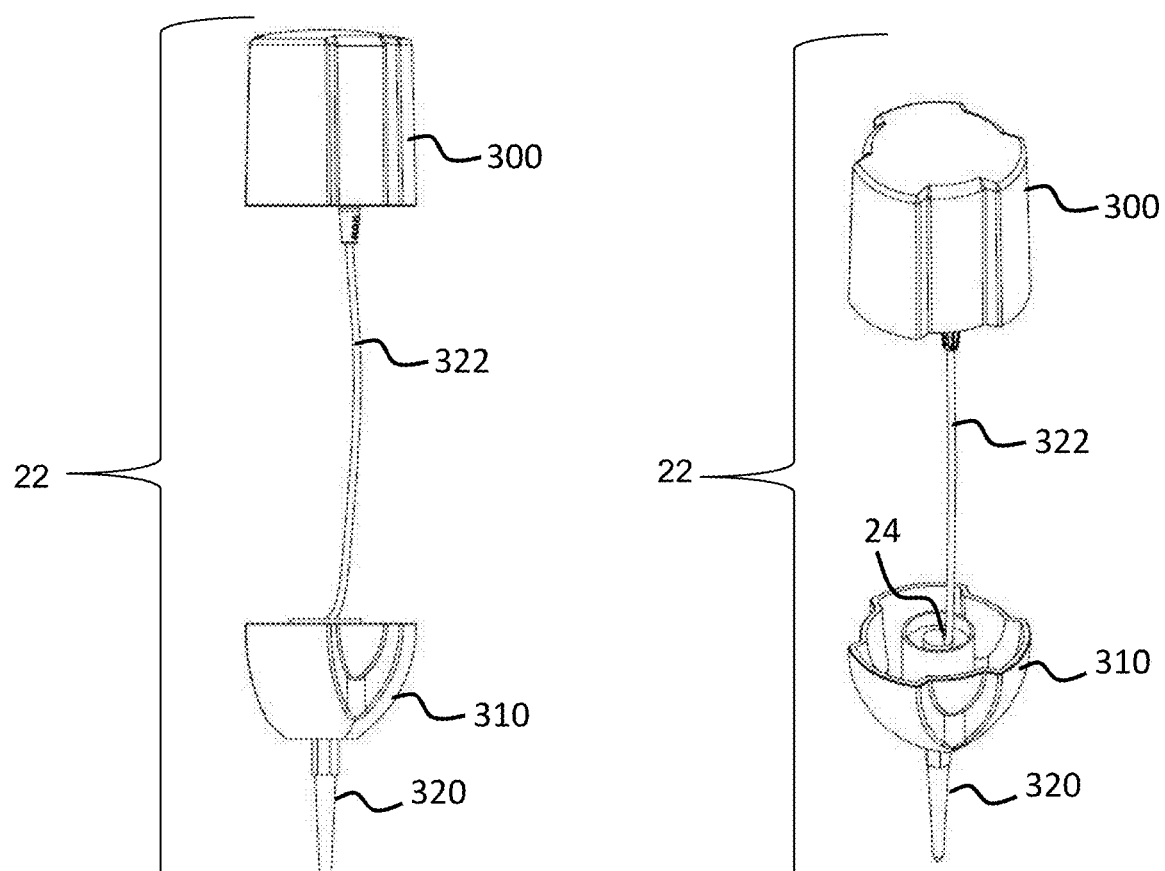

FIGS. 4A and 4B are schematic illustrations of separated parts of the seismic intrusion detector 22, according to some embodiments of the present invention. FIG. 4A shows a direct view of the seismic intrusion detector and FIG. 4B shows an isometric view.

As indicated in the figures, the seismic intrusion detector 22 also may include an electrically conductive, insulated wire 322, which connects the vibration sensor to the processor, and over which signals from the vibration sensor are transmitted to the processor. The conductive wire is sufficiently long such that the top and bottom parts of the seismic intrusion detector may be separated when buried.

When the top and bottom parts of the seismic intrusion detector are attached together, they form a case that contains the conductive wire. When the first and second parts are separated, the two parts may be buried at different depths. The length of the conductive wire is preferably configured such that each part of the seismic intrusion detector may be buried at an optimal depth, irrespective of the other part. Optimally, the vibration sensor 24 is buried at a relatively deep position in the ground, such as between 10 cm and 2 meters. As the depth increases, ground vibrations due to insignificant events, such as light rain, are muted. The top part 300, with the sensor controller 26, which may include the battery and the transmitter, is preferably buried close to the surface, for example between 5 cm and 10 cm deep. Burying the sensor controller close to the surface reduces the amount of attention that the earth imposes on wireless signals transmitted by the transmitter. As described above, when the sensor controller determines that seismic signals match a seismic threat pattern, it transmits a seismic alert to the hub processor.

In addition, when the sensor controller is buried close to the surface, the elements of the sensor controller can be more easily accessed for maintenance. This is particularly significant with respect to the battery, which must be occasionally replaced. In some embodiments, the processing elements of the sensor controller can be disconnected from the sensor controller (i.e., from the other elements, including the conductive wire), for easy maintenance. The processor within the sensor controller 26 may be connected by a waterproof connector to the conductive wire 322, and may be detachable from the conductive wire 322 in order that it may be replaced with a new sensor controller if there is a device failure.

As described above, in some embodiments the seismic intrusion detector 22 may include multiple vibration sensors 24, such that the bottom part may include multiple separable parts, each including an independent vibration sensor and a conductive wire 322 that attaches the independent vibration sensor to the sensor controller 26.

All or part of system 20 and of processes 100 and 200 can be implemented in digital electronic circuitry, or in computer hardware, firmware, software, or in combinations thereof. A computing system configured to implement the system may have one or more processors and one or more network interface modules. Processors may be configured as a multi-processing or distributed processing system. Network interface modules may control the sending and receiving of data packets over networks. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site or distributed across multiple sites. Memory storage may also include multiple distributed memory units, including one or more types of storage media. Examples of storage media include, but are not limited to, magnetic media, optical media, and integrated circuits such as read-only memory devices (ROM) and random-access memory (RAM).

It is to be understood that the invention and its application are not limited to the described above or the arrangement of the components set forth in the description or illustrated in the drawings, but are applicable to other embodiments that may be practiced or carried out in various ways. The scope of the present invention may include variations and modifications thereof which would occur to persons skilled in the art upon reading the foregoing description and which are not disclosed in the prior art. Method steps associated with the system and process can be rearranged and/or one or more such steps can be omitted to achieve the same, or similar, results to those described herein. Furthermore, it is to be understood that the phraseology and terminology employed herein is for the purpose of description and should not be regarded as limiting.

The invention claimed is:

1. A system for physical intrusion detection, comprising:
a seismic intrusion device comprising a vibration sensor and a sensor controller, wherein the sensor controller comprises a sensor controller memory that includes computer-readable instructions, which when executed by the sensor controller implement steps of:
  a. sampling a set of seismic signals from the vibration sensor,
  b. calculating a representative vibration level of the set of seismic signals,
  c. determining that the representative vibration level is greater than a predetermined vibration threshold and responsively changing a first precision setting to a second precision setting by increasing at least one of a sampling frequency, a sampling resolution, and an oversampling rate,
  d. sampling, according to the second precision setting, a second set of seismic signals from the vibration sensor for a predetermined second sampling time period,
  e. comparing the second set of seismic signals to one or more stored seismic threat patterns,
  f. determining that the set of seismic signals matches a seismic threat pattern, and
  g. responsively transmitting a seismic alert to a hub processor;
a video camera, configured to record a surveillance video of an area under which the sensor device has been buried and to transmit the surveillance video to the hub processor; and
the hub processor, comprising a processor memory including computer-readable instructions that when executed by the hub processor implement steps of processing the surveillance video to determine whether a human figure is present, and, responsively to determining that a human figure is present and to receiving the seismic alert, issuing a threat detection alert.

2. The system of claim 1, wherein issuing the threat detection alert comprises one or both of sounding a physical alarm and notifying security officers.

3. The system of claim 1, wherein the vibration sensor is affixed to a first part of the seismic intrusion device, wherein the sensor controller and a battery are affixed to a second part of the seismic intrusion device, wherein the first and second parts, when attached together, form a case containing a wire conducting seismic signals from the vibration sensor to the sensor controller, and wherein according to a length of the wire the first and second parts when separated are buriable at different depths.

4. The system of claim 2, further comprising additional vibration sensors, connected by additional respective wires to the sensor controller and affixed to additional, separable parts of the sensor device.

5. The system of claim 1, wherein determining that the set of seismic signals matches a seismic threat pattern comprises determining that a vibration level is greater than a predetermined vibration threshold.

6. The system of claim 1, wherein sampling the set of seismic signals comprises sampling according to a first precision setting including parameters of sampling frequency, sampling resolution, and oversampling rate.

7. The system of claim 1, wherein the seismic intrusion controller is further configured, after issuing the seismic alert, to determine that a subsequent set of seismic signals does not match one or more of the stored seismic threat patterns and responsively to restore the first precision setting and to continue testing seismic signals.

8. The system of claim 7, wherein restoring the first precision setting after issuing the seismic alert comprises decreasing the vibration threshold for a post-alarm time period.

9. The system of to claim 7, wherein restoring the first precision setting comprises gradually decreasing, over a period of time, one or more precision setting parameters until the parameters equal those of the first precision setting.

10. The system of claim 1, wherein comparing the second set of seismic signals to the one or more stored seismic threat patterns comprises filtering out noise from one or more of the seismic signals of the second set.

11. The system of claim 1, wherein determining there is a match comprises determining a distance from the seismic intrusion device to a seismic vibration source, and wherein transmitting the seismic alert comprises transmitting the seismic alert including a location of a probable intrusion.

12. The system of claim 1, wherein determining there is a match comprises determining a correlation between the second set of seismic signals and each of the one or more stored seismic threat patterns and comparing each respective correlation with a preset probability threshold defining a minimum correlation for a match.

13. The system of claim 1, wherein sampling the first set of seismic signals comprises sampling 15 to 100 samples and the second sampling time period is 5 to 30 seconds.

14. The system of claim 1, wherein calculating the representative vibration level comprises calculating a root mean square (RMS) value of the set of seismic signals.

15. The system of claim 1, wherein the sensor controller is further configured to determine that the set of seismic signals does not match a seismic threat pattern, and responsively to increase the vibration threshold for a post-event time period.

16. The system of claim 1, wherein the seismic intrusion device is one of multiple seismic intrusion devices, wherein the video camera is one of multiple video cameras, and wherein the hub processor associates seismic alerts from each seismic intrusion device with an associated video camera.

17. A method for detecting physical intrusion, implemented on at least one processor having at least one memory communicatively coupled to the at least one processor and comprising stored computer-readable instructions that when executed by the at least one processor cause to perform steps of:
sampling a set of seismic signals from a vibration sensor of a buried seismic intrusion device;
calculating a representative vibration level of the set of seismic signals;
determining that the representative vibration level is greater than a predetermined vibration threshold and responsively changing a first precision setting to a second precision setting by increasing at least one of a sampling frequency, a sampling resolution, and an oversampling rate;
sampling, according to the second precision setting, a second set of seismic signals from the vibration sensor for a predetermined second sampling time period;
comparing the second set of seismic signals to one or more stored seismic threat patterns;
determining that the set of seismic signals matches a seismic threat pattern;

responsively generating a seismic alert;
recording a surveillance video of an area under which the sensor device has been buried;
processing the surveillance video to determine whether a human figure is present; and
responsively to recognition of a human figure and to the generation of the seismic alert, issuing a threat detection alert.

* * * * *